United States Patent [19]

Sites

[11] Patent Number: 5,117,571
[45] Date of Patent: Jun. 2, 1992

[54] FISHHOOK BAITING DEVICE

[76] Inventor: Richie D. Sites, P.O. Box 4652, Midland, Tex. 79704

[21] Appl. No.: 729,946

[22] Filed: Jul. 15, 1991

[51] Int. Cl.⁵ .............................................. A01K 97/04
[52] U.S. Cl. .............................................. 43/4; 43/55
[58] Field of Search .......................................... 43/4, 55

[56] References Cited

U.S. PATENT DOCUMENTS

| | | | |
|---|---|---|---|
| 2,458,671 | 1/1949 | Zirbel | 43/4 |
| 2,846,803 | 8/1958 | Rettig | 43/4 |
| 3,964,201 | 6/1976 | Biliunas | 43/4 |
| 3,976,413 | 8/1976 | Popeil | 43/4 |
| 4,850,129 | 7/1989 | Hoepfner | 43/55 |

*Primary Examiner*—Kurt Rowan
*Attorney, Agent, or Firm*—Crutsinger & Booth

[57] ABSTRACT

A fishhook baiting device for baiting a fishhook with stink bait, dough bait, or cheese bait. The device comprises a dispenser head assembly having a hook chamber, a reservoir body forming a bait chamber for containing a quantity of bait, the bait chamber being in fluid communication with the hook chamber, and a plunger assembly for compressing the bait from the bait chamber into the hook chamber and extruding the bait through the hook chamber. A hook is placed inside the hook chamber and the hook chamber is closed. The bait is compressed into the hook chamber and onto the hook. Then hook chamber is opened and the baited hook is extruded from the hook chamber. The extruded bait is cut from the bait remaining in the device after the desired amount of bait has been extruded. The plunger assembly may have a flange that extends into the bait and embeds in the bait for pulling the cohesive bait remaining in the hook chamber back into the bait chamber, thereby clearing the hook chamber for the next hook.

16 Claims, 6 Drawing Sheets

FISHHOOK BAITING DEVICE

FIELD OF THE INVENTION

The invention generally relates to fishing tackle, and more particularly to a device for placing bait onto a fishhook.

BACKGROUND OF THE INVENTION

Fishermen often use stink bait or dough bait on the fishhook to attract fish. The bait is a pasty material that is highly odoriferous. The standard method of placing the bait onto the hook is by taking a portion of the bait in the fingers and pressing it onto the hook. The bait becomes smeared on the hands, pushed under the fingernails, and wiped on clothing. The material is tenacious and the odor persistent. As the fisherman fishes, he becomes increasingly odoriferous and concomitantly unpopular, especially with the fisherman's wife.

Studies have shown that fish are extremely sensitive to smell. Many types of fish are greatly attracted to stink bait. Some fishermen also believe that human scent will keep some fish from biting the baited hook. Therefore, some believe that applying bait with the hands is undesirable.

Furthermore, while attempting to place the bait onto a hook with the bare hand, the hook may slip and stab or tear the skin.

SUMMARY OF THE INVENTION

The invention is a fishhook baiting device for baiting a fishhook with stink bait, dough bait, or cheese bait. The bait is formed of a tenacious and cohesive material that can be compressed onto a fishhook.

The device comprises a dispenser head assembly having a hook chamber, a reservoir body forming a bait chamber for containing a quantity of bait, the bait chamber being in fluid communication with the hook chamber, and a suitable apparatus for compressing the bait from the bait chamber into the hook chamber and extruding the bait through the hook chamber.

The reservoir body forming a bait chamber has an access for filling the bait chamber with bait. The bait may be spooned into the bait chamber, squeezed from a bag into the bait chamber, or otherwise placed into the bait chamber without touching the bait with one's bare hands. The bait chamber is then closed.

The hook chamber is adapted to accommodate a hook. The hook is attached to fishing line and then placed inside the hook chamber. The hook chamber is closed, but the closure has sufficient clearance for the fishing line or a tiny hole is provided in the door of the hook chamber so that the fishing line may pass therethrough.

In a preferred embodiment of the invention, the apparatus for compressing the bait toward the dispenser head assembly and into the hook chamber is a plunger assembly. The bait chamber has walls that are all perpendicular to a plane or walls forming a cylinder so that a plunger or piston may reciprocate therethrough. The plunger presses the bait toward the dispenser head assembly and into the bait chamber so that the bait is compressed into the hook chamber and onto the hook.

In a preferred embodiment of the invention, the plunger assembly comprises a plunger, a threaded screw, and a screw head. The plunger has a threaded bore formed therein so that the plunger may be screwed onto the screw. The threaded screw and plunger are disposed within the bait chamber, the screw being supported near the screw head. The base of the screw is attached to the base of the reservoir body forming the bait chamber. The plunger frictionally engages the interior walls of the reservoir body. When the screw head is rotated, the frictional resistance to rotation of the plunger causes the plunger to reciprocate within the bait chamber along the threaded screw.

A preferred embodiment includes a locking assembly for removably attaching the plunger assembly to the base of the reservoir body and providing structural support to the threaded screw and screw head. The locking assembly comprises a lock housing, locking pegs that may engage with corresponding bores formed in the side walls of the reservoir body near the base of the reservoir body, and a spring for urging the locking pegs into engagement with the bores formed in the reservoir body. The base of the screw of the plunger assembly is placed through a bore in the lock housing such that the lock housing supports the screw within the bait chamber of the reservoir body. The screw may freely rotate within the bore of the lock housing so that the screw head may be turned to rotate the screw and reciprocate the plunger.

In the preferred embodiment hereinafter described in detail, the bait chamber is cylindrical in shape. The locking assembly further comprises cam surfaces on the plunger. When the plunger is positioned adjacent the lock housing, the cam surfaces on the plunger engage corresponding cam surfaces connected to the locking pegs. The locking pegs are urged to oppose the spring and to disengage the locking pegs from the corresponding bores formed in the reservoir body. Thereby the locking assembly and plunger assembly may be removed from the reservoir body. When the plunger assembly and the locking assembly are removed from the base of the reservoir body, the reservoir body may be filled with bait or cleaned.

In the preferred embodiment hereinafter described in detail, the reservoir body is cylindrical, which presents special problems for engaging the locking assembly and plunger assembly to the reservoir body. When the plunger is positioned on the screw adjacent to the lock housing such that the cam surfaces interact to retract the locking pegs, the locking pegs do not engage the base of the reservoir body to prevent rotation of the lock housing around the screw of the plunger assembly. The lock housing and the locking pegs must be rotated into position so that the locking pegs may engage the corresponding bores formed in side walls of the reservoir body. Therefore, the screw has a washer spring placed between the screw head and the lock housing. When the screw head is rotated, the washer spring applies frictional resistance to rotation of the lock housing. The lock housing is thereby rotated with the screw head. As the screw head is rotated, the screw also is rotated and the plunger is reciprocated along the screw and away from the lock housing, thereby allowing the spring of the lock housing to urge the locking pegs outward from the lock housing. When the locking pegs on the lock housing are rotated into alignment with the corresponding bores on the reservoir body, the locking pegs are urged into the bores and lock the locking assembly into position. The frictional resistance to rotation of the lock housing applied by the spring washer is not so great as to prevent the screw head from being rotated when the locking assembly is locked into position on the reservoir body.

The hook chamber is opened, a fishhook is placed therein, and then the hook chamber is closed again. The plunger compresses bait from the bait chamber into the hook chamber and onto the hook. In a preferred embodiment the hook chamber is then opened again so that a perfectly baited hook is extruded from the hook chamber. The extruded bait is cut from the bait remaining in the dispenser head assembly after the desired amount of bait has been extruded with the fishhook. The extruded bait is preferably cut at the top of the dispenser head assembly, outside the hook chamber. Otherwise, if the bait is cut between the bait chamber and the hook chamber, for example, then the bait might tenaciously adhere to the walls of the hook chamber and cause the baited hook to pull out of the extruded bait when trying to separate the hook from the fishhook baiting device.

In a preferred embodiment, when the bait is extruded and then the extruded bait is cut from the top of the dispenser head assembly outside the hook chamber, the hook chamber remains filled with unextruded bait. A preferred embodiment of the device has a flange attached to the interior surface of the plunger of the plunger assembly. The flange extends into the interior of the bait chamber. When the bait is compressed with the plunger, the flange becomes embedded in the bait material. Therefore, when the plunger is pulled away from the dispenser head assembly, the flange, which is embedded in the cohesive bait material, causes the bait to be pulled from the hook chamber, thereby clearing the hook chamber for the next hook.

Therefore, it is an object of the invention to provide a fishhook baiting device that can be used to place stink bait, dough bait, or cheese bait onto a fishhook. It is another object of the invention to provide a fishhook baiting device that the fisherman can use to bait a fishhook with stink bait, dough bait, or cheese bait without touching the bait with his hands. It also is an object of the invention to provide a fishhook baiting device that is safe to use. It is another object of the invention to provide a fishhook baiting device that packs bait around a hook better than can be done with the bare hands. It is an object of the invention to provide a fishhook baiting device that packs the bait onto a fishhook from all sides so that the bait remains on the fishhook up to twice as long as bait placed onto a fishhook with the bare hands. It is yet another object of the invention to provide a fishhook baiting device that keeps bait fresh in a sealed container. It is a further object of the invention to provide a fishhook baiting device that is easy to use and easy to clean.

BRIEF DESCRIPTION OF THE DRAWING

Drawings of a preferred embodiment of the invention are annexed hereto so that the invention may be better and more fully understood in which.

Numerical references are employed to designate like parts throughout the various figures of the drawings.

DESCRIPTION OF A PREFERRED EMBODIMENT

After describing the cooperation of parts of a preferred embodiment of the fishhook baiting device, the operation of the device will be described in detail.

Figure 1:
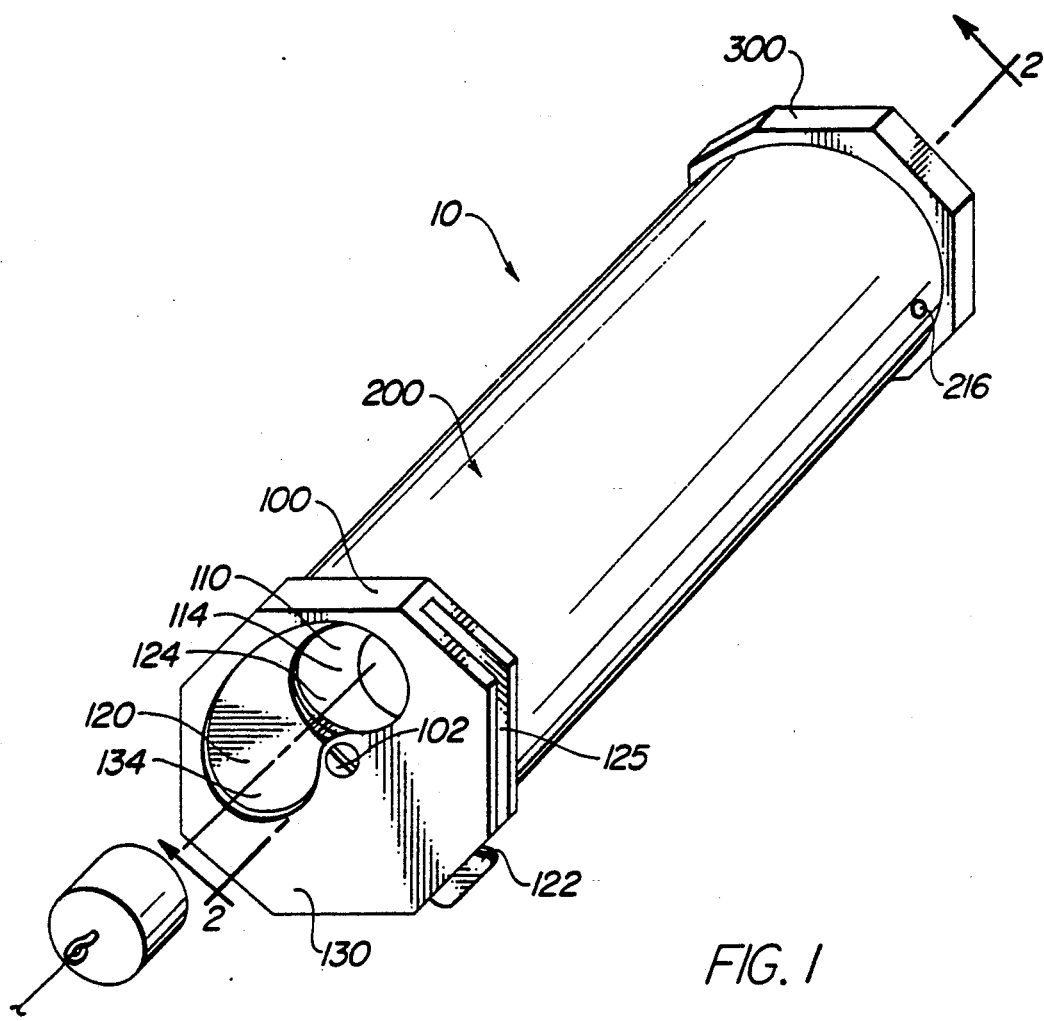
FIG. 1 is a perspective view of a preferred embodiment of the fishhook baiting device.

Referring now to FIG. 1 of the drawings, the numeral 10 generally designates a preferred embodiment of the fishhook baiting device. As will be described in more detail, the fishhook baiting device 10 generally comprises dispenser head assembly 100, reservoir body 200, plunger assembly 300, and locking assembly 400. In the preferred embodiment illustrated in the drawings, the fishhook baiting device is generally cylindrical. For convenience of description, the dispenser head assembly 100 is assumed to be at the top or upper end of the cylindrical reservoir body 200. The plunger assembly 300 and locking assembly 400 are assumed to be located at the base or lower end of the reservoir body 200.

Figure 2:
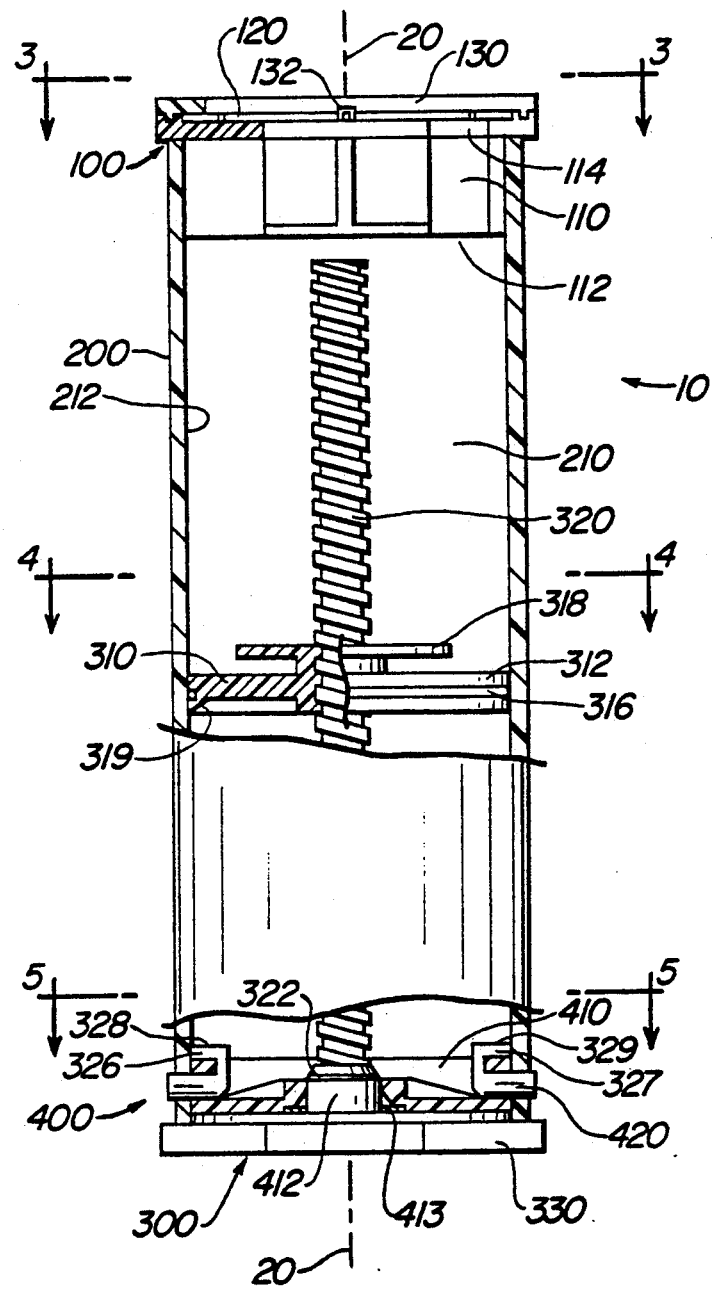
FIG. 2 is a cross-section view taken along line 2—2 of FIG. 1.
Figure 3:
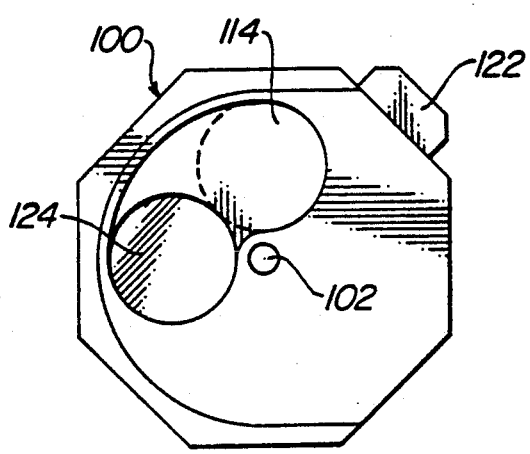
FIG. 3 is a top-plan view taken along line 3—3 of FIG. 2.

As best shown in FIG. 2, a fragmentary cross-section view of a preferred embodiment, the dispenser head assembly 100 is adapted to be permanently mounted onto the reservoir body 200. If the dispenser head assembly 100 and the reservoir body 200 are made of metal, they may be arc welded together or otherwise permanently connected. In the preferred embodiment of the invention, the dispenser head assembly 100 and the reservoir body 200 are made of a plastic material. The plastic dispenser head assembly 100 and reservoir body 200 may be electronically welded together or otherwise permanently connected.

In an alternative embodiment, the dispenser head assembly 100 may be removably mounted on the reservoir body 200 to provide access to the interior bait chamber 210 of the reservoir body 200. If the dispenser head assembly 100 is removably mounted on the reservoir body 200, a means (not shown) for removably locking the dispenser head assembly 100 onto the reservoir body 200 should be provided.

The dispenser head assembly 100 may be generally cylindrical in shape and has at least one hook chamber 110 formed therein. The hook chamber 110 should be large enough to accommodate a typical fishhook. In the preferred embodiment, the hook chamber 110 is cylindrical in shape, having cylindrical walls and being open at both ends. The hook chamber 110 of the preferred embodiment has an internal diameter of about three-quarter ($\frac{3}{4}$) inch and a height of about three-quarter ($\frac{3}{4}$) inch. The axis of the hook chamber 110 is offset from the axis 20 of dispenser head assembly 100 and the fishhook baiting device 10.

The hook chamber 110 has one opening 112, best shown in FIG. 2, that communicates with the bait chamber 210 of the reservoir body 200 and another opening 114, best shown in FIG. 1, that communicates with the outside of the fishhook baiting device 10.

The dispenser head assembly also has a cut-off plate 120, shown in FIGS. 1-3 and 8-9, that opens and closes the opening 114 of chamber 110. The cut-off plate 120 is adapted to movably slide over the opening 114 of hook chamber 110. In the preferred embodiment of the invention, cut-off plate comprises a circular plate 120 having an axis 20 and a hole 124 formed therein. The axis 20 of the cut-off plate 120 is concentrically aligned with the axis 20 of the dispenser head assembly 100 and the fishhook baiting device 10. As will be hereinafter described in detail, post 132 maintains the cut-off plate 120 in axial alignment with the dispenser head assembly. As best shown in FIG. 1, cut-off plate 120 has a lever 122 that extends from the edge of cut-off plate 120. The post 132 allows free rotation of the cut-off plate 120 about the axis 20 in response to manipulation of the lever 122.

The axis of hole 124 is offset from the axis 20 of the cut-off plate 120 and the axis 20 of the fishhook baiting device 10. When the cut-off plate 120 is rotated with lever 122 about axis 20, the axis of hole 124 may slidably move into alignment with the axis of hole 114 of the hook chamber 110, thereby opening hook chamber 110. When the cut-off plate is properly oriented, the axis of hole 124 should align with the axis of hook chamber 110 and the area of the hole 124 should overlap with the area of the opening 114 of hook chamber 110. For example, if the axis of the hook chamber 110 is offset one (1) inch from the axis of the dispenser head assembly 100 and the axis of the fishhook baiting device 10, then the axis of the hole 124 in the circular cut-off plate 120 should also be offset one (1) inch from the axis 20 of the circular cut-off plate 120 and the fishhook baiting device 10. If the area of the opening 114 of the hook chamber 110 is a circle three-quarter ($\frac{3}{4}$) inch in diameter, the area of the hole 124 should also be three-quarter ($\frac{3}{4}$) inch in diameter.

In a preferred embodiment, the cut-off plate 120 is formed of a transparent material so that one can see into the hook chamber 110 and determine when it is filled with bait.

In the preferred embodiment of the invention, the dispenser head assembly 100 has a cover plate 130. The cover plate 130 serves to wipe the cut-off plate 120 clean of bait, thereby keeping the exposed surfaces of the fishhook baiting device 10 clean. In the preferred embodiment of the invention, cover plate 130 is configured as shown in FIGS. 1-3 and 8-9. Except for the kidney shaped opening 134 formed in the cover plate 130, the cover plate 130 completely overlays the cut-off plate 120. A portion of the kidney shaped opening 134 must overlap with the opening 114 of the hook chamber 110. Cover plate 130 does not rotate about axis 20.

Figure 8:
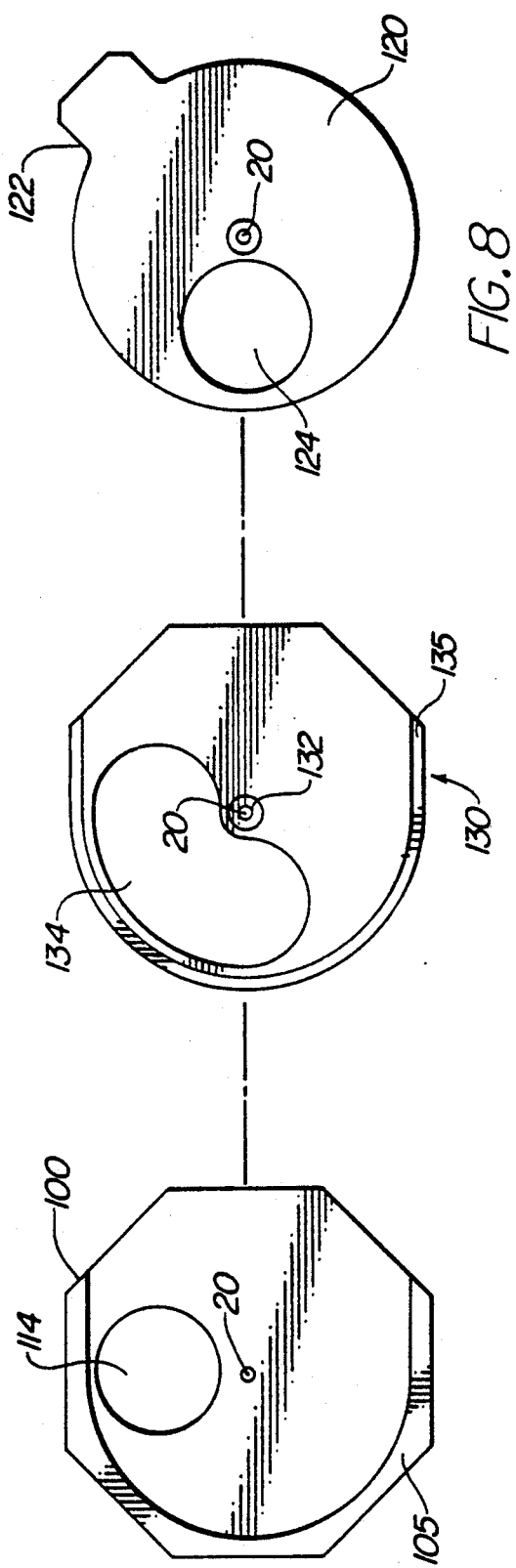
FIG. 8 is an exploded top plan view of the dispenser head assembly of the fishhook baiting device shown in FIGS. 1 and 2.
Figure 9:
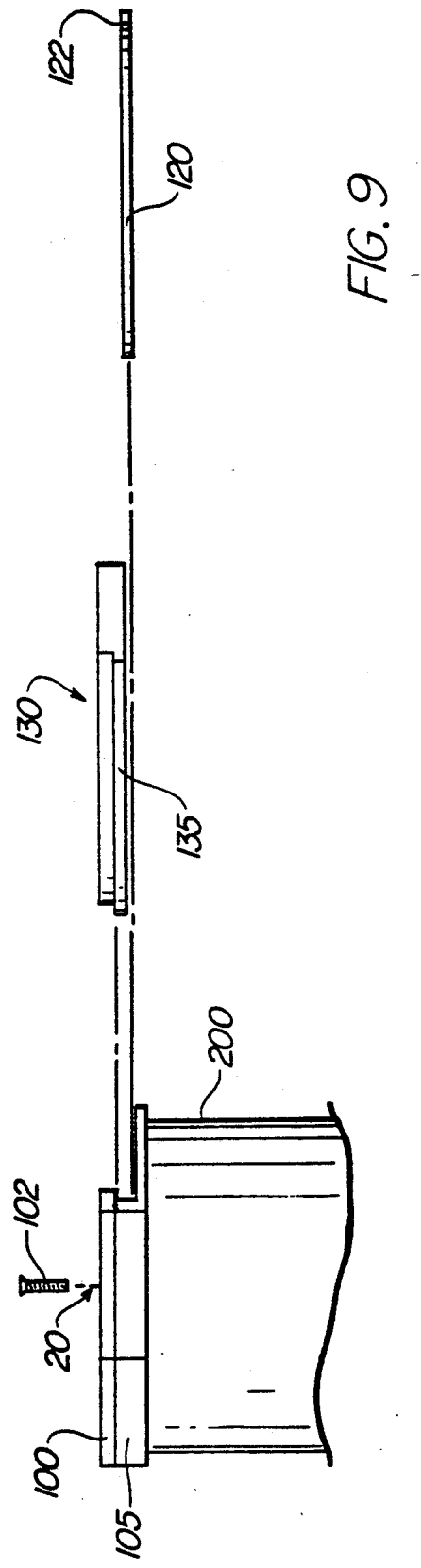
FIG. 9 is an exploded side view of the dispenser head assembly of the fishhook baiting device shown in FIGS. 1 and 2.

In the preferred embodiment shown in the drawings, the cover plate 130 is attached at the edges to the body of the dispenser head assembly. The cover plate 130 is mounted to the dispenser head assembly as shown in FIGS. 8 and 9. The upwardly extending portion 105 of the dispenser head body provides a groove into which surfaces 135 of the cover plate 130 may slidably engage. The underside of the cover plate 130 has a short post 132. The post 132 is slightly longer than the height of the cut-off plate 120. A screw 102 is used to hold the cover plate 130 and the cut-off plate 120 in position on the dispenser head assembly. The post 132 allows the cut-off plate 120 to rotate even if the screw 102 is over-tightened.

An opening 125 between the cover plate 130 and the dispenser head assembly body 100 is provided for the lever 122 to extend therethrough so that the cut-off plate 120 may be manually rotated with the lever 122. As best shown in FIG. 1, when the cut-off plate 120 is rotated from the open position (the position shown in FIG. 1), to the closed position (the position shown in FIG. 3), the exposed surface of the cut-off plate 120 is wiped clean of any bait as it slides under the cover plate 130.

Screw 102 may be unscrewed so that the engaging surfaces 135 of the cover plate 130, which holds the cut-off plate 120 by post 132, may be slidably removed from the upwardly extending portion 105 of the dispenser head, thereby allowing the dispenser head assembly 100 to be thoroughly cleaned as desired.

The reservoir body 200 of the fishhook baiting device 10 has a bait chamber 210 formed therein for holding a quantity of bait. As best shown in FIG. 2, in the preferred embodiment of the invention, the reservoir body 200 comprises a cylinder having inner and outer cylindrical walls. One end of the cylindrical reservoir body 200 is closed by the dispenser head assembly 100. The reservoir body 200 is a cylinder having for example an internal diameter of about two-and-a-half (2.5) inches and a height of about seven (7) inches. The bait chamber 210 has a volume sufficient to bait about forty (40) to fifty (50) fishhooks, depending on the amount of bait extruded for each hook.

The plunger assembly 300 of the fishhook baiting device 10 is adapted to compress the bait within the bait chamber 210 of the reservoir body 200. When the bait is compressed, it is forced into and through the hook chamber 110 as will hereinafter be described in detail. In a preferred embodiment, the plunger assembly 300 closes the bait chamber 210 at the end of the reservoir body that is opposite to the dispenser head assembly 100 as will be hereinafter described.

As shown in FIGS. 1-7, in the preferred embodiment, the plunger assembly 300 is adapted to be removably mounted onto the reservoir body 200 so as to provide access to the interior of the reservoir chamber 210. A locking assembly 400 removably locks the plunger assembly 300 onto the reservoir body 200.

Figure 6:
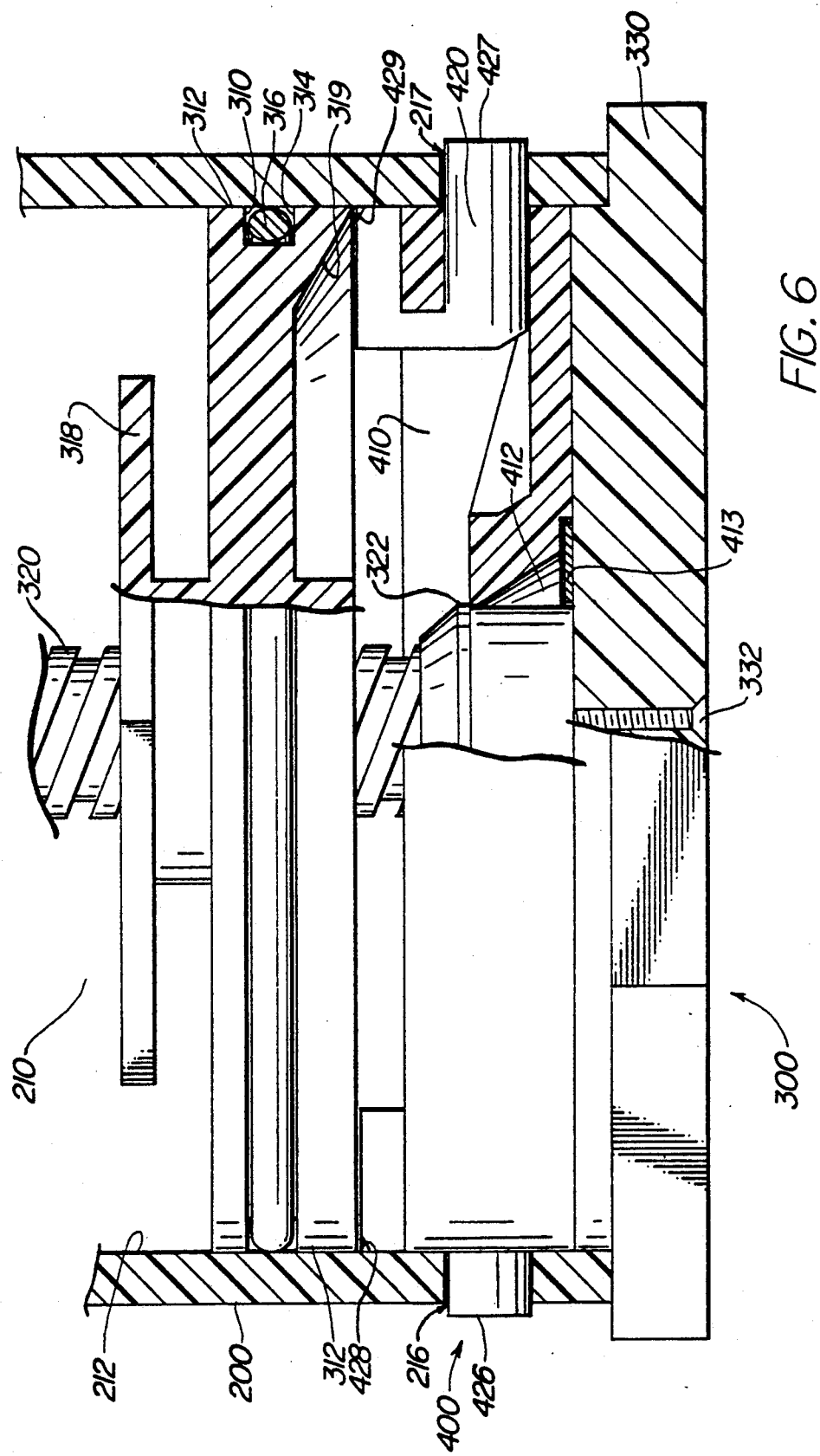
FIG. 6 is an enlarged cross-section fragmentary view of the base portion of the fishhook baiting device shown in FIG. 2.
Figure 7:
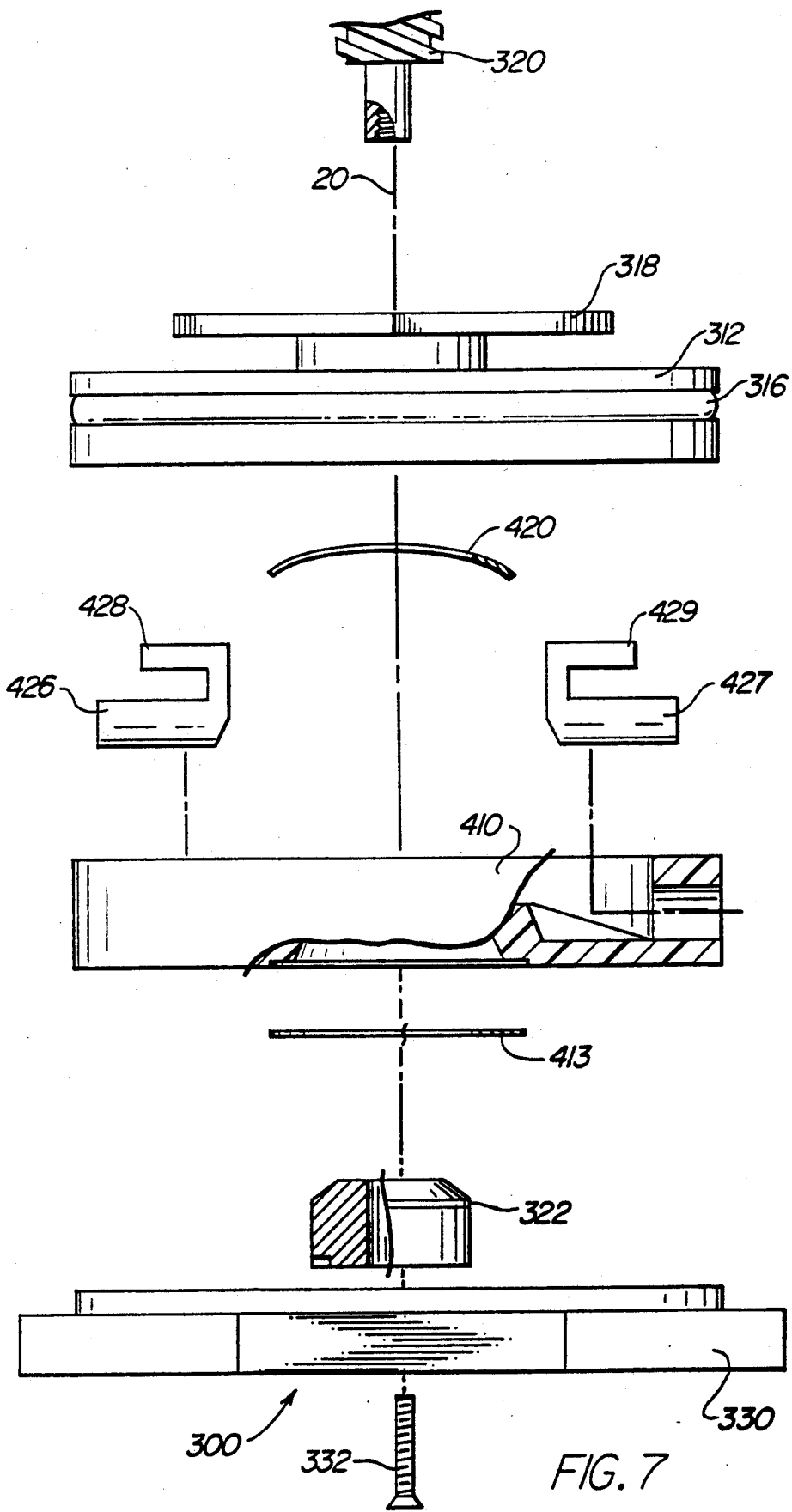
FIG. 7 is an exploded fragmentary view of the base portion of the fishhook baiting device showing the locking mechanism.

In a preferred embodiment of the invention, best illustrated in FIGS. 2 and 6, the plunger assembly 300 comprises a plunger 310, a screw 320, and a screw head 330. When the screw head 330 is rotated, the plunger 310 reciprocates along the screw 320 within the bait chamber 210. The preferred embodiment includes a locking assembly for removably locking the plunger assembly 30 to the reservoir body 200 and providing structural support to the plunger assembly 300. The screw 320 and plunger 310 are disposed within the bait chamber 210.

The plunger 310 is a cylinder having outer walls 312 that have a diameter slightly less than the internal diameter of the bait chamber 210. The axis of the plunger 310 is concentrically aligned with the axis 20 of the interior of the bait chamber 210 and the axis 2 of the fishhook baiting device 10. The height of the plunger 310 should be sufficient to prevent the axis of the plunger 310 from becoming misaligned within the bait chamber 210. In the preferred embodiment of the invention, the height of the plunger 310 is about one-quarter ($\frac{1}{4}$) inch.

In a preferred embodiment, as best illustrated in FIG. 2, a circumferential groove 314 is formed in the vertical outer walls 312 of the cylindrical plunger 310. The axis of the groove 314 is concentric with the axis of the cylindrical plunger 330. The groove 314 is about eight-tenths (0.8) inch deep and about one (1.0) inch wide. An narrow annulus is formed between the cylindrical plunger 310 and the inner walls of the bait chamber 210. The difference in the diameter of the plunger 310 and the inner diameter of the bait chamber 210 is only about two-tenths (0.2) inch. The annulus between the plunger 310 and the inner walls 212 of the bait chamber 210 is sealed with a rubber or plastic O-ring 316 that fits snugly in the groove 314 of the plunger 310. The friction between the O-ring 316 and the inner walls 212 of the bait chamber 210 also prevents the plunger 310 from rotating about the axis 20 of screw 320 as will be hereinafter explained more fully.

In the preferred embodiment, as shown in FIG. 2, a threaded bore is formed through the center of the plunger 310. The threaded bore is essentially cylindrical but having threaded walls and the axis of the threaded bore is concentric with the axis of the plunger 310. The screw 320 is reciprocally threaded and screwed through the threaded bore of the plunger 310. The threaded bore and screw 320 may be, for example, a three-eighths ($\frac{3}{8}$) inch Acme single thread, left handed. A large screw head 330 is attached to the screw 320 for manually turning the screw 320. The screw head 330 may be attached to the screw 320 with a small bolt 332. In the preferred embodiment, the screw head 330 is octagonal and fits comfortably into the palm of the hand. The non-circular shape helps the hand to grip and turn the screw head, even when the fishhook baiting device is wet and slippery. The non-circular shape also helps prevent the fishhook baiting device 10 from rolling off deck surfaces.

When the screw head 330 is manually rotated, the screw 320 is rotated. The frictional resistance between the O-ring 316 and the inner walls 212 of the bait chamber 210 prevent the plunger 310 from rotating with the screw 320. Therefore, when the screw 320 is rotated, the plunger 310 is vertically reciprocated within the bait chamber 210. Whether the plunger 310 moves up or down is determined by which direction the screw 320 is rotated and whether the threads of the screw 320 are left or right handed.

Figure 4:
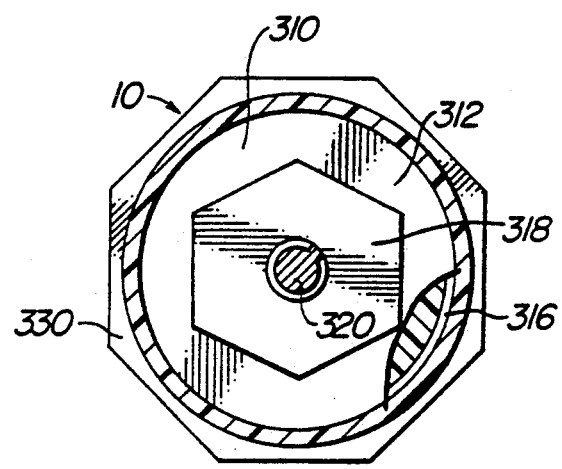
FIG. 4 is a cross-section fragmentary view taken along line 4—4 of FIG. 2 of the fishhook baiting device showing the plunger assembly of the device.
Figure 5:
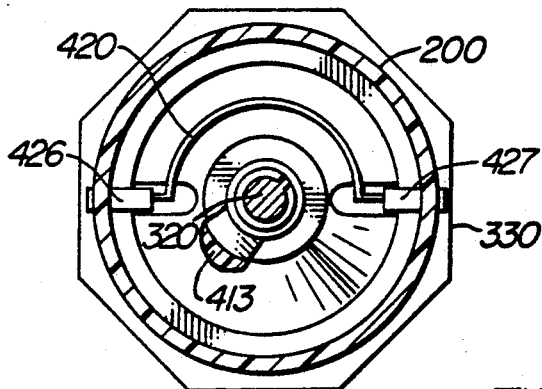
FIG. 5 is a cross-section view taken along line 5—5 of FIG. 2 of the fishhook baiting device showing the base portion of the device.

In a preferred embodiment of the invention, best illustrated in FIGS. 2, 4, and 6 of the drawings, the plunger 310 has a upwardly extending hexagonal flange 318. As will hereinafter be explained in detail, when the plunger 310 compresses the bait within the bait chamber 210, the upwardly extending flange 318 becomes embedded in the bait. When the plunger 310 is moved away from the dispenser head assembly 100, the flange 318 pulls the bait within the dispenser head assembly and the bait chamber away from the dispenser head assembly, clearing the hook chamber of any remaining bait.

In the preferred embodiment of the invention, best illustrated in FIGS. 2, 5, 6, and 7, the plunger assembly 300 is removably locked into place and supported with a locking mechanism 400.

The locking assembly 400 generally comprises a lock housing 410, locking pegs 426 and 427 that engage with corresponding bores 216 and 217 formed in the side walls of the reservoir body 200 near the base of the reservoir body, and a locking spring 420 for urging the locking pegs 426 and 427 into engagement with the bores 216 and 217, respectively, formed in the reservoir body 200.

The lock housing 410 is generally cylindrical and adapted to engage the end of the reservoir body 200 that is opposite the dispenser head assembly 100. The lock housing 410 has for example a height of about one-third ($\frac{1}{3}$) inch and an outer diameter that is slightly smaller than the inner diameter of the cylindrical reservoir body 200.

A non-threaded bore 412 is formed through the center of the lock housing 410. The non-threaded bore 412 is essentially cylindrical and the axis of the non-threaded bore 412 is concentric with the axis of the lock housing 410. The inner diameter of the non-threaded bore 412 is slightly larger than the outer diameter of the screw 320. During assembly of the device, the screw 320 is placed through the bore 412 of the lock housing 410. In the preferred embodiment, the lock housing 410 and screw head 330 are adapted to retain the screw 320 completely within the bait chamber 210 as shown in FIGS. 2 and 6. The lock housing and plunger assembly 300 are formed of a plastic material. The non-threaded bore 412 through the lock housing 410 may be tapered or at least partially conical in shape. The tapered end of the non-threaded bore 412 is directed toward the interior of the reservoir body 200. The portion of the tapered non-threaded bore 412 having the smallest diameter is slightly smaller than the a diameter of an outwardly extending flange 322 located on the screw 320 near the screw head 330. A circular spring 413, generally shaped like a washer but formed of a slightly resilient material may be included to provide frictional resistance to rotation between the screw head 330 and the lock housing 410.

During assembly of the fishhook baiting device 10, the screw 320 is pushed through the spring 413 and then through the bore 412 of the lock housing 410. The plastic of the surfaces of the non-threaded bore 412 snaps over the flange 322 on the screw 320. The flange 322 and the screw head 330 retain the screw 320 in position within the non-threaded bore 412. Once snapped into the lock housing 410, the screw 320 is retained in place and cannot be easily disengaged. Because the bore 412 is non-threaded, the screw 320 can be freely rotated by the screw head 330. After snapping the screw 320 and the lock housing 410 together, the plunger 310 is screwed onto the screw 320.

The base of the screw 320 of the plunger assembly 300 is placed through a non-threaded bore 412 in the lock housing 410 such that the lock housing 410 supports the screw 320 within the bait chamber 210 of the reservoir body 200. The screw 320 may freely rotate within the non-threaded bore 412 of the lock housing 410 so that the screw head 330 may be turned to rotate the screw 320 and reciprocate the plunger 310 within the bait chamber 210.

The locking spring 420 has a semi-circular body. Also connected to the opposite ends of semi-circular body of the locking spring 420 are two pegs 426 and 427. The two pegs 426 and 427 are cylindrical in shape and have axes that are coaxially aligned. The pegs 426 and 427 are adapted to engage with two shallow, cylindrical holes 216 and 217 formed in the inner cylindrical walls of the reservoir body 200. The locking pin 420 is preferably formed of a resilient plastic material, though it may alternatively be formed of a metal such as stainless steel. The resiliency of the plastic semi-circular body 420 provides the outward force to the locking pegs 426 and 427.

In the preferred embodiment of the invention, a cam means is used to disengage the pegs 426 and 427 from the lock housing 410. The plunger 310 has a downwardly extending circumferential cam surface 319 that can engage a similar cam surfaces 428 and 429 on each of the pegs 426 and 427. When the plunger 310 is rotated so that it is closest to the lock housing 410, the cam surface 319 on the plunger can engage the cam surfaces 428 and 429 on the pegs 426 and 427. The interaction of the cam surfaces causes an inward force on the pegs 426 and 427, thereby disengaging the pegs 426 and 427 from the holes 216 and 217 in the reservoir body 200 and disengaging the lock housing 400 and plunger assembly 300 from the end of the reservoir body 200. When the plunger assembly and the locking assembly are removed from the base of the reservoir body, the reservoir body may be filled with bait or cleaned.

In the preferred embodiment, the reservoir body 200 is cylindrical, which presents special problems for re-engaging the locking assembly 400 and plunger assembly 300 to the reservoir body. When the plunger 310 is positioned on the screw 310 adjacent to the lock housing 410 such that the cam surfaces interact to retract the locking pegs, the locking pegs 426 and 427 do not engage the base of the reservoir body 200 to prevent rotation of the lock housing 410 around the screw 320 of the plunger assembly 300. The lock housing 410 and the locking pegs 426 and 427 must be rotated into position so that the locking pegs may engage the corresponding bores 216 and 217 formed in the side walls of the reservoir body 200. Therefore, the screw 320 has a washer spring 413 placed thereon between the screw head 330 and the lock housing 410. The washer spring is preferably formed of stainless steel. When the screw head 330 is rotated, the washer spring 413 applies frictional resistance to rotation of the lock housing 410. The plunger 310 is reciprocated along the screw 320 and away from the lock housing 410, thereby allowing the spring 413 of the lock housing 410 to urge the locking pegs 426 and 427 outward from the lock housing 410. When the locking pegs on the lock housing are rotated into alignment with the corresponding bores 217 and 217 on the reservoir body, the locking pegs are urged into the bores and lock the locking assembly 400 into position. The frictional resistance to rotation of the lock housing 410 applied by the spring washer 413 is not so great as to prevent the screw head 330 from being rotated when the locking assembly is locked into position on the reservoir body.

Now that the cooperation of the parts of preferred embodiments of the fishhook baiting device 10 have been described, the operation of the device will be described in detail.

To fill the fishhook baiting device 10 with bait, follow three simple steps.

First, manually rotate the screw head 330 to move the plunger 310 toward the lock housing 410. If the screw 320 is left handed, the screw head should be rotated counter-clockwise. When the plunger 310 is fully raised, the downwardly extending circumferential cam 319 should engage the cam surfaces 428 and 429 on the pegs 426 and 427 to cause the pegs 426 and 427 to disengage from the holes 216 and 217 in the interior walls of the reservoir body 200. Once unlocked, remove the lock housing 410 and plunger assembly 300 from the reservoir body 200 to expose the interior bait chamber 210.

Second, using a spoon or other utensil, fill the bait chamber 210 with any type of stink bait, dough bait, or cheese bait. Alternatively, squeeze the bait into the bait chamber 210 from a plastic bag or tube. Leave sufficient space in the bait chamber 210 for the plunger 310 and the lock housing 410.

Third, insert the plunger assembly 300 and locking assembly 400 into the bait chamber 210. While pushing in on the screw head 330, rotate the screw head 330 to disengage the interaction of the cams so that the resilient plastic material of the spring 413 forces the pegs 426 and 427 to protrude slightly from the lock housing 410 and against the interior side walls of the bait reservoir 200. When the screw head 330 is rotated, the frictional resistance between the screw head 330 and the lock housing 410 provided by the washer spring 413 causes the lock housing 410 to rotate with the screw head 330 until the locking pegs 426 and 427 snap into the corresponding bores 216 and 217 in the walls of the reservoir body 200.

To bait a hook with the fishhook baiting device 10, follow eight simple steps.

First, using the lever 122, manually rotate the cut-off plate about axis 20 so that the axis of hole 124 of the cut-off plate 120 slidably moves into alignment with the axis of hole 114 of the hook chamber 110, thereby opening hook chamber 110.

Second, place a fishhook that is tied to a fishing line into the hook chamber 110.

Third, using the lever 122, manually rotate the cut-off plate about axis 20 so that the axis of hole 124 of the cut-off plate 120 slidably moves out of alignment with the axis of hole 114 of the hook chamber 110, thereby closing hook chamber 110. The fishing line passes between the dispenser head assembly 100 and the cut-off plate 120 and does not interfere with the rotation of the cut-off plate.

Fourth, turn the screw head 330 to move the plunger 310 toward the dispenser head assembly 100. The bait within the bait chamber 210 should first compress, then be forced into the hook chamber 110, and finally against the cut-off plate 120. If the cut-off plate is clear, one can see when the bait has filled the hook chamber 110. At this point the bait is compressed onto the fishhook in the hook chamber 110.

Fifth, using the lever 122, manually rotate the cut-off plate about axis 20 so that the axis of hole 124 of the cut-off plate 120 slidably moves into alignment with the axis of hole 114 of the hook chamber 110, thereby opening hook chamber 110 and exposing the baited hook.

Sixth, manually turn the screw head 330 to continue movement of the plunger 310 toward the dispenser head assembly. This forces more bait into the hook chamber 110 and causes the baited hook to be extruded in a tube of bait. Continue to turn the screw head 330 until the fishhook completely clears the opening 114 at the top of the hook chamber 110. Thereafter continue to turn the screw head 330 until the desired amount of bait has been extruded from orifice 114 of the hook chamber 110.

Seventh, using the lever 122, manually rotate the cut-off plate about axis 20 so that the axis of hole 124 of the cut-off plate 120 slidably moves out of alignment with the axis of hole 114 of the hook chamber 110, thereby cutting off the extruded bait and closing hook chamber 110. In a preferred embodiment of the fishhook baiting device 10, it is equipped with a cover plate 130. As the cut-off plate 120 is rotated, any bait adhering to the exposed surface of the cut-off plate 120 is wiped off by the edges of the kidney shaped hole 134 formed in the cover plate 130 attached to the dispenser head assembly 100.

Eighth, manually turn the screw head 330 in a direction to cause the plunger 310 to move away from the dispenser head assembly 100. The upwardly extending hexagonal flange 318, which is embedded into the bait material within the bait chamber 210, pulls the cohesive bait out of the hook chamber 110 and away from the dispenser head assembly 100. The fishhook baiting device is then ready to bait the next hook.

Numerous alterations, modifications, and changes can be made in the design of the invention without departing from the scope and spirit of the invention and defined by the claims.

I claim:

1. An apparatus for baiting a fishhook with bait, the apparatus comprising:
    (a) a reservoir body forming a bait chamber for containing a quantity of bait;
    (b) a dispenser head assembly having a hook chamber for a fishhook, said hook chamber being in fluid communication with said bait chamber;
    (c) a means for opening and closing said hook chamber so that a fishhook may be placed therein; and
    (d) means for compressing bait from said bait chamber into said hook chamber and onto the fishhook enclosed within said hook chamber so that the fishhook becomes embedded within the compressed bait and the fishhook may then be extruded with the compressed bait when said means for opening and closing said hook chamber is reopened.

2. The apparatus of claim 1 wherein said means for compressing the bait comprises a plunger means and said reservoir body forming said bait chamber has interior side walls that are all perpendicular to a plane so that said plunger means may reciprocate therebetween.

3. The apparatus of claim 1 wherein said means for compressing the bait comprises a plunger means and said reservoir body forming said bait chamber is cylindrical so that said plunger means may reciprocate therethrough.

4. The apparatus of claim 3 wherein said plunger means comprises:
    (a) a threaded screw;
    (b) a screw head mounted on said threaded screw for turning said threaded screw;
    (c) a cylindrical plunger, said plunger having a threaded bore for screwing said plunger onto said threaded screw, said plunger having an interference fit with the interior of said cylindrical bait chamber such that when said screw is rotated said plunger is reciprocated within said cylindrical bait chamber; and
    (d) a means for supporting said threaded screw within said bait chamber.

5. The apparatus of claim 4 wherein said cylindrical plunger has a circumferential groove formed thereon and an O-ring placed in said circumferential groove on said plunger, said O-ring sealing the annulus formed between said cylindrical plunger and said cylindrical bait chamber and said O-ring providing frictional resistance to the rotation of said plunger, thereby causing an interference fit and preventing said cylindrical plunger from rotating when said screw is rotated by said screw head.

6. The apparatus of claim 4 wherein said means for supporting said screw of said plunger means within said bait chamber comprises a means for removably attaching said plunger means to said reservoir body, thereby providing access to said bait chamber for filling said bait chamber with bait and cleaning said bait chamber.

7. The apparatus of claim 6 wherein said means for removably attaching said plunger means to said reservoir body comprises:
    (a) a cylindrical lock housing, at least a portion of said lock housing adapted to fit within the end of the cylindrical bait chamber that is opposite said dispenser head assembly, said lock housing having an axial bore so that said screw of said plunger means may pass therethrough;
    (b) locking pegs on said lock housing;
    (c) means for urging said locking pegs to protrude from the cylindrical sides of said lock housing;
    (d) bores formed in the interior walls of said reservoir body corresponding to at least one rotational orientation of said locking pegs on said lock housing so that said locking pegs may interlock with said bores thereby attaching said plunger means to said reservoir body; and
    (e) means for urging said locking pegs to retract from the cylindrical sides of said lock housing and disengage said bores when said plunger of said plunger means is moved adjacent said lock housing so that said plunger means may be removed from said reservoir body.

8. The apparatus of claim 7 wherein said means for urging said locking pegs to protrude from the cylindrical sides of said lock housing comprises a spring means.

9. The apparatus of claim 7 wherein said means for urging said locking pegs to disengaging said bores when said plunger is moved adjacent said lock housing comprises:
    (a) first cam surfaces on said plunger; and
    (b) second cam surfaces on said locking pegs; said first cam surfaces on said plunger corresponding to said second cam surfaces on said locking pegs such that when said plunger is moved adjacent said lock housing, said first cam means engage said second cam means thereby urging said locking pegs to disengage from said bores.

10. The apparatus of claim 7 further comprising a washer spring between said lock housing and said screw head, said washer spring providing frictional resistance such that when said screw head is rotated, said lock housing is similarly rotated until said locking pegs on said lock housing rotationally align with said bores in the walls of said reservoir body, but said frictional resistance does not prevent said screw head from rotating when said locking pegs have engaged said bores so that said lock housing may rotate independent of said screw head.

11. The apparatus of claim 4 wherein said plunger means further comprises a means for pulling the bait from said hook chamber back into said bait chamber, thereby clearing said hook chamber and preparing the hook chamber for the next hook.

12. The apparatus of claim 11 wherein said means for pulling the bait from said hook chamber back into said bait chamber comprises a flange connected to said plunger, said flange extending into said bait chamber, so that when said plunger compresses the bait within said bait chamber, said flange becomes embedded in the compressed bait material, whereby when said plunger is pulled away from said dispenser head assembly, said flange embedded in the cohesive bait material causes the bait to be pulled from said hook chamber.

13. The apparatus of claim 1 wherein said means for opening and closing said hook chamber comprises a slidable cut-off plate, said cut-off plate being pivotally connected to said dispenser head assembly.

14. The apparatus of claim 13 wherein said slidable cut-off plate is at least partially transparent.

15. A method of baiting a fishhook with stink bait, dough bait, or cheese bait without touching the bait, the method comprising the steps of:
   (a) placing bait within a reservoir body defining a cylindrical bait chamber;
   (b) positioning a dispenser head assembly adjacent the bait chamber, the dispenser head assembly having a hook chamber and being positioned such that the hook chamber and bait chamber are in fluid communication;
   (c) placing a fishhook within the hook chamber;
   (d) closing the hook chamber;
   (e) reciprocating a plunger means within the bait chamber so that the bait is compressed from the bait chamber into the hook chamber and onto the hook;
   (f) opening the hook chamber; and
   (g) reciprocating the plunger means within the bait chamber so that the bait with the hook embedded therein is extruded from the hook chamber.

16. An apparatus for baiting a fishhook with bait, the apparatus comprising:
   (a) a reservoir body forming a cylindrical bait chamber for containing a quantity of bait;
   (b) dispenser head assembly having a hook chamber for a fishhook, said hook chamber being in fluid communication with said bait chamber;
   (c) means for opening and closing said hook chamber so that a fishhook may be placed therein;
   (d) plunger means for compressing bait from said bait chamber into said hook chamber and onto the fishhook enclosed within said hook chamber so that the fishhook becomes embedded within the compressed bait and the fishhook may then be extruded with the compressed bait when said means for opening and closing said hook chamber is re-opened; and
   (e) means for removably attaching said plunger means to said reservoir body comprising:
   i. a cylindrical lock housing, at least a portion of said lock housing adapted to fit within the end of the cylindrical bait chamber that is opposite said dispenser head assembly, said lock housing having an axial bore so that said plunger means may pass therethrough;
   ii. locking pegs on said lock housing;
   iii. means for urging said locking pegs to protrude from the cylindrical sides of said lock housing;
   iv. bores formed in the interior walls of said reservoir body corresponding to at least one rotational orientation of said locking pegs on said lock housing so that said locking pegs may interlock with said bores thereby attaching said plunger means to said reservoir body; and
   v. means for urging said locking pegs to retract from the cylindrical sides of said lock housing and disengage said bores when said plunger of said plunger means is moved adjacent said lock housing so that said plunger means may be removed from said reservoir body.

* * * * *

UNITED STATES PATENT AND TRADEMARK OFFICE
CERTIFICATE OF CORRECTION

PATENT NO.   :   5,117,571
DATED        :   June 2, 1992
INVENTOR(S)  :   Richie D. Sites It is certified that error appears in the above-identified patent and that said Letters Patent is hereby corrected as shown below:

Column 6, line 55, change "30" to read -- 300 --;

Column 6, line 63, change "2" to read -- 20 -- .

Signed and Sealed this

Thirteenth Day of July, 1993

Attest:

MICHAEL K. KIRK

*Attesting Officer*                *Acting Commissioner of Patents and Trademarks*